April 1, 1952 D. I. CRITOPH 2,591,139
FILM HANDLING APPARATUS FOR PROJECTION DEVICES
Filed Nov. 12, 1947 2 SHEETS—SHEET 1

INVENTOR.
DAVID I. CRITOPH
BY
ATTORNEY

April 1, 1952     D. I. CRITOPH     2,591,139
FILM HANDLING APPARATUS FOR PROJECTION DEVICES
Filed Nov. 12, 1947     2 SHEETS—SHEET 2
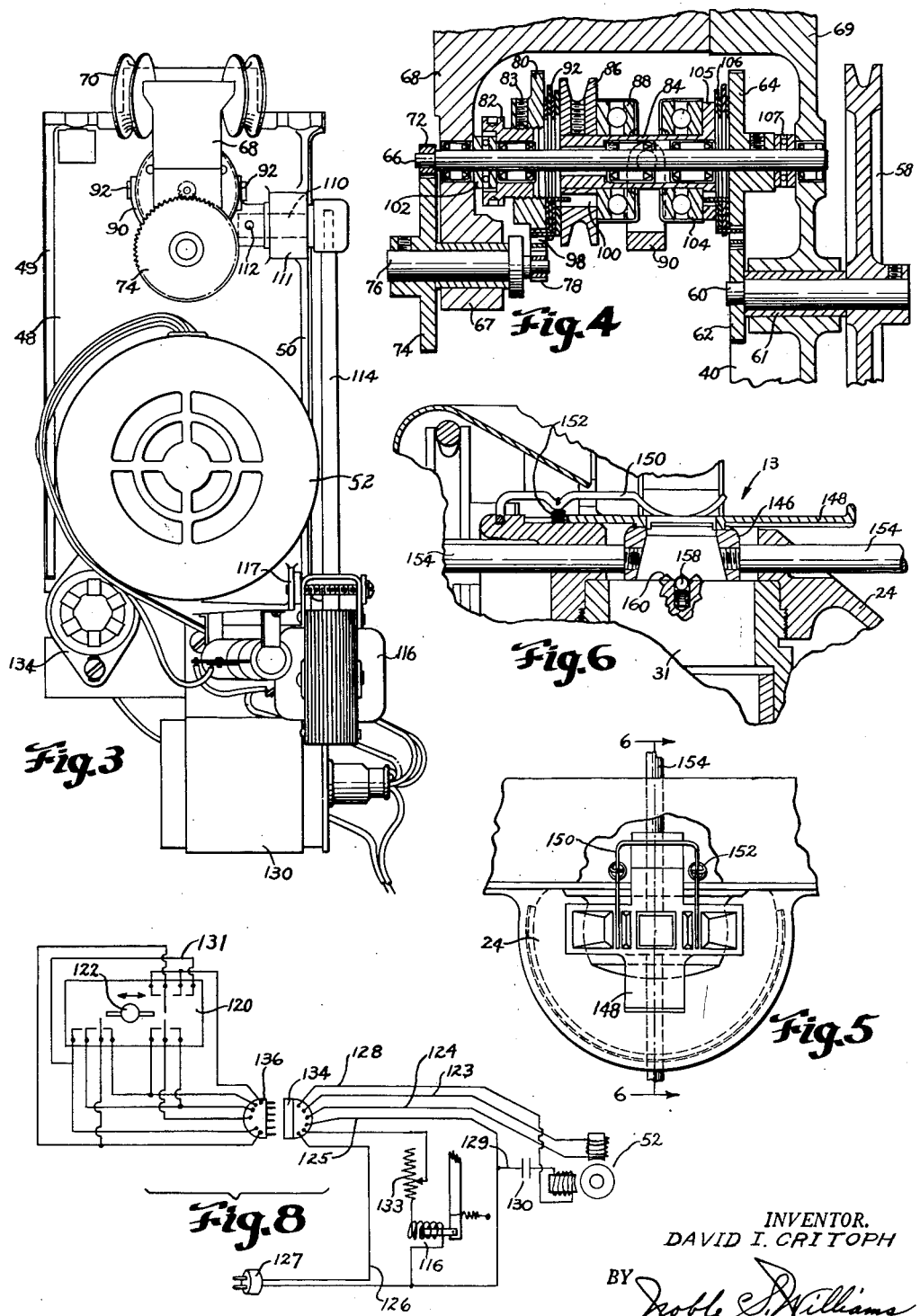
INVENTOR.
DAVID I. CRITOPH
BY
ATTORNEY Patented Apr. 1, 1952

2,591,139

UNITED STATES PATENT OFFICE 2,591,139

FILM HANDLING APPARATUS FOR PROJECTION DEVICES

David I. Critoph, Snyder, N. Y., assignor to American Optical Company, Southbridge, Mass., a voluntary association of Massachusetts Application November 12, 1947, Serial No. 785,284

13 Claims. (Cl. 88—24)

This invention relates to film projection devices and more particularly to film handling apparatus for moving strip film through a film gate carried on a rotatable film reel supporting head for the selective projection of images of individual frames thereof onto a viewing screen associated therewith.

It has become common practice to employ strip film of small sizes to serve as permanent compact photographic records of printed matter and the like. For example, an accurate record of both sides of a large number of cancelled bank checks may be printed upon a single small reel of 16mm. film. Microfilm readers comprising enclosed cabinet-like structures housing projection systems and viewing screens have been provided as convenient means for readily reviewing the contents of such strip film and since the individual pictures may be differently oriented upon the face of the film, it is desirable to be able to rotate the film supporting head and the associated film gate for properly positioning the image in an upright position upon the viewing screen. Copending application Serial No. 660,231, filed April 6, 1946, now Patent No. 2,482,666, issued September 20, 1949, shows such a defice as just described including either manual means or motor means with reduction gearing for moving film across the film gate aperture. The motor drive means is the more convenient of the two to use but when of the simple type disclosed in said application it is not entirely satisfactory. If it is geared to drive the film across the aperture slowly enough to allow inspection of individual frames as well as the accurate centering of any one at the film gate aperture, the travel of the film through the gate at times when such inspection is not necessary (for example, during winding or re-winding of the film) is much too slow to be practical. On the other hand, if the film speed is increased, inspection and centering of individual frames cannot be conveniently and accurately accomplished.

It is, accordingly, an object of the present invention to provide for microfilm readers and the like film reel driving mechanism comprising a reversible electric motor and driving means for selectively moving strip film across a film gate aperture in either direction and at either slow or high predetermined speeds as desired.

It is a further object of the invention to provide in such film driving mechanism quick acting operator controllable means for effecting a predetermined slow speed or high speed film travel in either direction.

It is an additional object of the invention to provide for use with such a motor operated driving mechanism or the like a manual control and electrical connections for operating and reversing a capacitor-starting, capacitor-run permanent split phase induction motor therefor. The control is constructed and arranged so that slight amounts of rotation in either direction may be effected for producing small increments of movement of the film across the film gate aperture for centering purposes. The control means is also constructed so as to additionally control a change speed structure associated with said driving mechanism.

It is a further object of the invention to provide for the electric motor of the present invention a brake mechanism arranged to reduce to a minimum the "over running" of the motor due to the inertia after the electric current has been shut off.

It is a further object of the invention to provide a film driving mechanism of the type described which is of a compact construction and which may be readily inserted or removed from the interior of the reader cabinet as a preassembled and adjusted unit. It is also an object to provide attaching means for said unit which will allow easy engagement and adjustment with a flexible driving belt associated with a film driving element in the cabinet.

While ordinarily an objective is employed in such film readers having a magnification sufficient to substantially fill the viewing screen when the film gate aperture is imaged thereon, it may be desirable at other times to employ an objective or objectives of considerably higher magnifications. Under such conditions movement of the film by small increments longitudinally through the gate could be used to effect a complete longitudinal coverage of an individual frame. This, however, would allow only the central part of the film to be inspected. In order that parts of the film laterally spaced from this central part may be imaged upon the screen, the invention provides a laterally shiftable film gate and means for maintaining the gate in various predetermined positions of lateral adjustment. In this manner, for example, the four quadrants of an image of a magnification four times that of the ordinary image may be inspected upon the viewing screen by merely shifting the film gate to one side and then the other and by properly adjusting the film longitudinally in the gate.

Other objects and advantages of the invention will become apparent from the detailed description which follows when taken in conjunction with the accompanying drawings in which:

Fig. 3 is a front elevational view of the assembly of Fig. 2;

Fig. 4 is an enlarged longitudinal sectional view taken substantially on line 4—4 of Fig. 2 and looking in the direction of the arrows;

Fig. 5 is a fragmentary plane view of the rotatable film reel supporting head and shiftable gate structure of the present invention;

Fig. 6 is an enlarged sectional view of the gate structure of Fig. 5 and taken substantially on line 6—6 thereof;

Fig. 8 is an electrical circuit diagram employed in the mechanism of Fig. 1.

Figures 1, 2, 7:
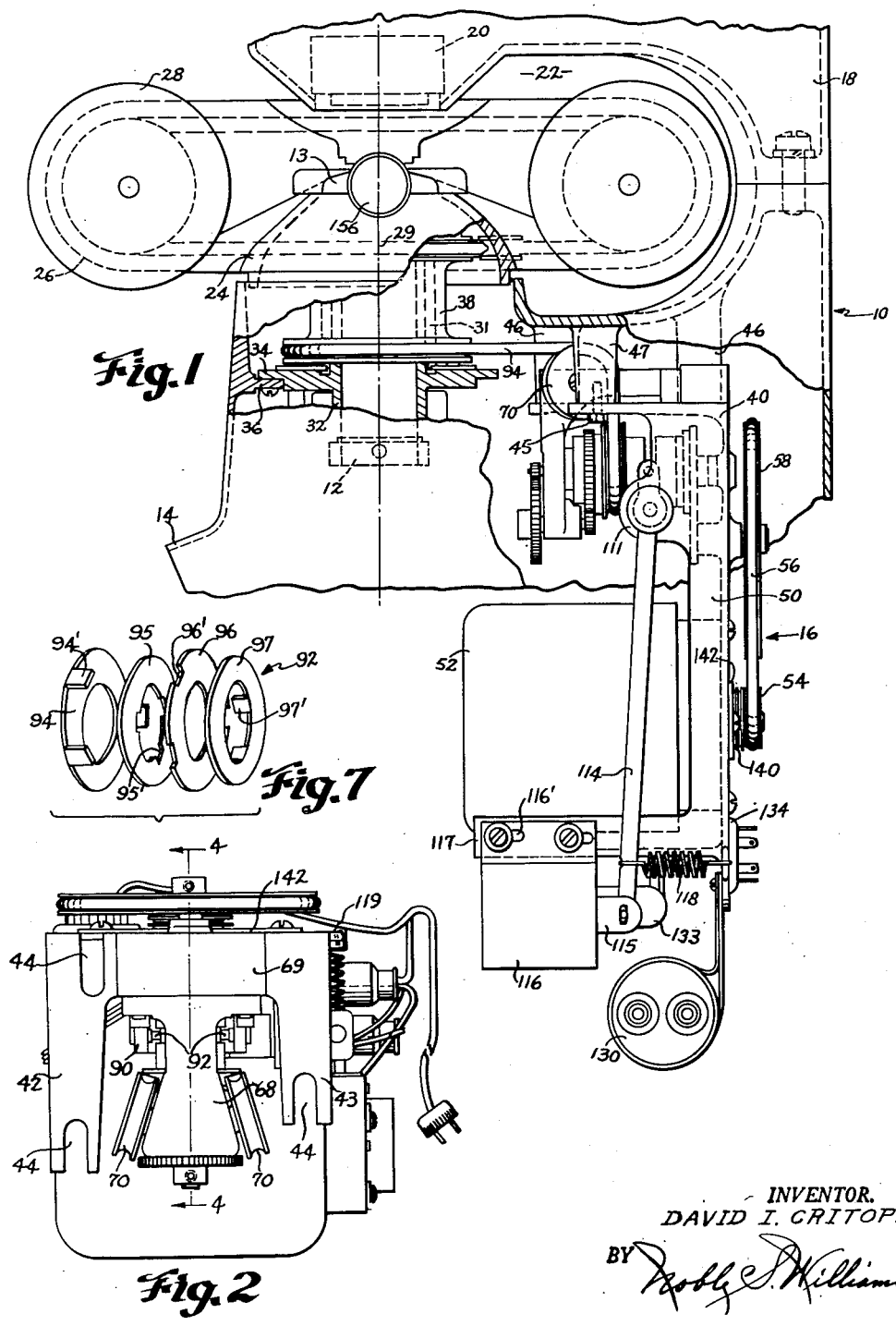
Fig. 1 is a side elevational view of a portion of a microfilm reader and partly in section to show a film reel driving mechanism embodying the present invention.
Fig. 2 is a plane view of part of the driving mechanism of Fig. 1, shown as a separable unitary assembly.
Fig. 7 is an exploded view showing details of parts of the mechanism of Fig. 1.

Referring to the drawings in detail and particularly Fig. 1, the numeral 10 indicates generally an upper portion of an enclosed cabinet type microfilm reader of a construction and arrangement in which an objective lens system 12 is disposed so as to direct image forming rays from the film at the film gate 13 downwardly toward a reflector (not shown) near the bottom of the cabinet which in turn directs the rays upwardly and slightly forwardly to fall upon a translucent viewing screen which preferably extends forwardly from and substantially in the plane of the lip portion 14. The enclosed cabinet is of a sturdy hollow construction arranged to compactly house the projection lens system of the instrument as well as a film actuating assembly 16 the details of which will be presently described.

An upper rear portion of the cabinet is arranged to detachably receive a hollow housing 18 in which is arranged the illuminating bulb (not shown) and condenser lens assembly 20 for the instrument. The hollow housing 18 is shaped to provide an overhanging and forwardly projecting arrangement in such a manner that a recess 22 of appreciable size is formed to accommodate a rotatable film reel supporting head 24 having laterally extending arms 26 for supporting film reels 28. The recess 22 is of such size as to accommodate these arms and reels and allow unrestricted rotational movement about the optical axis 29 of the microfilm reader. Thus regardless of the orientation of individual frames upon the strip film, the image thereof being projected upon the viewing screen may be rotated any desired amounts to bring same to an upright position or the like.

The film reel supporting head 24 is rotatably mounted by a tubular sleeve 31 upon a stationary cylindrical bearing member 32 which has a flange 34 integral therewith for detachably securing same upon an internally extending flange 36 of the cabinet 10. The objective 12 may be slidably mounted within the cylindrical bearing member 32 for focusing adjustment in any conventional manner. A driving element or ring 38 is mounted for rotation about the tubular sleeve of the supporting head 24. The construction of the head 24 and the film actuating parts thereon are substantially like the structure described and claimed in the above mentioned copending application.

As previously stated, it is desirable to provide for such microfilm readers a motor operated film driving mechanism or apparatus of sufficient flexibility to allow the film to be moved rapidly or slowly in either direction across the film gate, and of such sensitivity that individual frames of the film may be easily centered at the film gate aperture. The film driving mechanism 16 accomplishes such movement and control of the film and comprises a unitary assembly having a supporting frame 40 detachably carried by the cabinet. As clearly shown in Fig. 2 this frame comprises a pair of horizontally extending spaced arms 42 and 43 provided with slots 44 through which a plurality of bolts (one being shown at 45 in Fig. 1) may extend for clamping the arms and thus the assembly to a plurality of downwardly projecting integral bosses 46, 47. The supporting frame also comprises an elongated plate-like portion 48 extending downwardly from the arms 42 and the opposite edges thereof are provided with flanges 49 and 50 for strengthening purposes.

A reversible electric motor 52 is attached to the plate-like portion 48 and has its driving shaft extended therethrough for carrying a pulley 54 thereon. A flexible belt 56 serves to transmit power from the motor to an appreciably larger pulley 58 carried by stub shaft 60 journaled in a bushing 61 in the portion 48. To the opposite end of this stub shaft is secured a gear 62. Gear 62 in turn is arranged to mesh with a larger gear 64 secured upon a drive shaft 66. One end of this shaft is carried by a roller bearing mounted in the portion 48 while the opposite end thereof is supported by a similar bearing mounted in a downwardly extending arm 67 of a detachable bracket 68. The bracket 68, as best shown by Fig. 2, is detachably secured to an enlarged upper central portion 69 of the supporting frame 40, between the arms 42 and 43, and in such spaced relation to said arms that a pair of angularly disposed pulleys 70 suitably journaled near the forward end of the bracket may readily receive a flexible belt when placed thereover.

Upon the outer end of shaft 66 (see Fig. 4) is carried a pinion 72 which is in mesh with a large gear 74 carried by a stub shaft 76 journaled in arm 67 of bracket 68. A small gear 78 upon the inner end of this stub shaft is arranged in meshing engagement with a larger gear 80 screw-threaded upon a rotatable member 82 supported by a roller bearing upon the shaft 66. A set screw 83 maintains proper adjustment of gear 80 relative to member 82. A sleeve 84 carried by a pair of roller bearings upon an intermediate portion of shaft 66 has one end portion thereof arranged to receive a driving pulley 86. A thrust bearing 88 is positioned on the sleeve and adjacent one side of the pulley and is normally held in engagement therewith by a yoke 90 carrying a pair of inwardly projecting short pins 92 in engagement with this thrust bearing.

In this manner the pulley 86 has its opposite side pressed into engagement with a clutch mechanism 92 so that the rotation of gear 80 will be normally transmitted by the clutch to the pulley and effect a similar rotation of the pulley for driving a belt 94. This belt extends upwardly and over the said pair of angularly disposed pulleys 70, and then extends forwardly to encircle the pulley shaped lower end of the driving ring or element 38. A grooved portion at the upper end of the ring 38 is arranged to receive a second flexible belt for driving the reel supporting spindles on the rotatable head 24 through one way clutch mechanisms substantially like those shown in detail in said copending application.

The clutch mechanism 29 comprises, as better shown in Fig. 7, a set of preferably four flat disc-like members. The first member 94 is arranged with a plurality of lugs 94' upon its peripheral edge and arranged to extend at right angles to the plane of the disc. The second disc member 95 is of such size as to fit freely within the lugs 94' so that a third disc member 96 of substantially the same diameter as the first disc may have peripheral notches 96' therein arranged to receive the lugs 94'. The lugs 94' are of sufficient length to extend beyond a fourth disc member 97 and into circumferentially spaced openings 98 (see Fig. 4) in the gear 80 so that rotation of this gear will cause plates 94 and 96 to rotate therewith.

Plate 97, on the other hand, is provided with a plurality of inner circumferentially spaced lugs 97' arranged to extend at right angles to the plane of disc 97 and oppositely to the direction of the lugs 94'. They are of such relative spacing as to fit freely within the central apertures in discs 94 and 96. The disc 95, however, has a center aperture of sufficiently smaller diameter so that notches 95' formed in the inner edge thereof will be engaged by lugs 97'. Lugs 97' extend sufficiently beyond the disc 94 when in assembled arrangement to engage in a plurality of circumferentially spaced openings 100 provided in the pulley 86. A thrust bearing 102 is provided upon shaft 66 for opposing axial movement of sleeve 82 and gear 80 toward the left.

The arrangement is such that when discs 95 and 97 are caused to rotate they will in turn drive the pulley 86. Since normally the yoke 90 axially presses the pulley 86 into firm engagement with the assembled clutch plates 92, power from gear 80 will be transmitted to pulley 86. Under such conditions the average speed of rotation thereof will be such as to move the film through the film gate 13 at an average slow speed approximately 50 frames per minute. This speed is such as to allow a person to obtain a general impression of the image of each frame as it passes across the viewing screen.

If yoke 90, on the other hand, is caused to move slightly toward the right, as viewed in Fig. 4, short pins 92 will press a thrust bearing 104 axially toward a flange 105 of sleeve 84 at the opposite end thereof so as to urge the flange into engagement with a second clutch mechanism 106 similar to mechanism 92. When this slight axial movement of sleeve 84 occurs, power will be transmitted from shaft 66 through gear 64 and the clutch mechanism 106 to flange 105. At the same time, pulley 86 will be moved away from gear 80 sufficiently to allow freedom in clutch mechanism 92. Thus the pulley 86 will be free to move at the relatively higher speed of gear 64 and this speed will depend upon the gear ratios of gears 72, 74, 78 and 80. A small thrust bearing 107 is provided to oppose axial movement of the gear 64 toward the right.

The structure for effecting the change of speed of the driving pulley 86 comprises a shaft 110 (see Figs. 1 and 3) journaled in a boss 111 formed integral with the flange 50 of the frame member 40. The inner end of the shaft is pinnned to the yoke 90, as indicated at 112, so as to move therewith while the outer end of the shaft has threaded or otherwise secured therein a relatively long lever 114 to the lower end of which is connected the armature 115 of a solenoid 116. The solenoid is adjustably carried upon a projecting arm 117 of the frame member 40 as indicated at 116'. A spring 118 connected to the lever and to a lug 119 of the frame member 40 serves to urge the lower end of this lever toward the lug. The yoke 90 is thus effected for maintaining a driving connection between gear 80 and pulley 86. However, when solenoid 116 is energized, movement of the lower end of the lever 114 toward the solenoid will effect a transmission of power directly from gear 64 to pulley 86.

In Fig. 8 is diagrammatically shown a double throw switch 120 and a wiring diagram for controlling the operation of the motor 52 as well as solenoid 116. It has been found advantageous to employ at 52 a motor of the capacitor-starting, capacitor-run, permanent split phase type. When a switch arm 122, (which may be conveniently located upon the cabinet in front of the viewing screen) is moved to a first position toward the right a main winding of the motor will be connected by conductors 123 and 124 to power supply conductors 125 extending from plug 127. At the same time one end of an auxiliary or starting winding of the motor will be connected by conductor 128 to the power supply conductor 126. The opposite end is permanently connected by circuit 129 including a relatively large capacitor 130. Since the auxiliary winding and capacitor are constructed and arranged to place this winding out of phase, preferably 90 degrees, with the main winding the motor 52 will be rotated in a predetermined direction at a predetermined speed. A further movement to the right of the arm 122 to a second position will effect a closing of a circuit 131 through solenoid 116. Immediately lever 114 will be actuated to effect a change from low to high speed as described above.

Movement of arm 122 to the left, on the other hand, to a first position will reverse the connections between main winding conductors 123, 124 and power supply leads 125, 126. Also the auxiliary winding conductors 128, 129 will be connected in reverse relation to leads 125, 126. This will again place the auxiliary winding out of phase, preferably 90 degrees, with the main winding but this phase displacement will be in the opposite direction to the first displacement with the result that the motor 52 will be rotated in the opposite direction. Movement of arm 122 to a second position to the left will energize solenoid 116.

An adjustable resistor 133 is arranged in the solenoid circuit and allows the power to the solenoid to be adjusted after all of the parts of the driving mechanism have been assembled. This enables compensating for variations in friction in the parts and in strength of spring 118, too much power to solenoid 116 obviously being objectionable from the standpoint of noise and wear and tear on the operating parts involved. Adjustment of resistance 133 may also be made should continued use of the mechanism cause a change in the friction or should the strength of spring 118 change somewhat.

While the electrical conductors have been omitted from the structure of Fig. 1 for clearness, they have, nevertheless, been shown in Figs. 2 and 3. It will be readily apparent therefrom that by the provision of a gang socket 134 on the frame 40 switch 120 may be detachably connected thereto, through the medium of a complimentary gang plug 136. It is desirable to arrange the driving mechanism as a compact assembly which may be readily inserted or removed from the enclosed cabinet of the instrument as a single unit. The driving mechanism can thus be assembled and properly adjusted for operation before it is placed in the housing 10. When the assembly is being placed in the housing 10 the slots 44 in the arms 42 and 43 allow the asembly to be moved fore and aft sufficiently to place a proper amount of tension in the belt 94, after same has been placed beneath pulley 96 and over pulleys 70.

It is desirable to have the film travel across the film gate aperture start and stop substantially immediately. The motor 52 is of such a character that it will start the film travel as desired. However, the momentum of its rotor is sufficient to cause appreciable "over running" of the film, and to overcome this it may be preferred to employ an inexpensive but effective brake means therefor. Accordingly, adjacent the pulley 54 on the motor 52 may be positioned a brake assembly 140 employing a plurality of disc-like members of the same general construction as the clutch plates shown in Fig. 7. One end plate of the brake assembly is provided with lugs arranged to engage in circumferentially spaced openings (not shown) in the pulley 54 while the other end plate of the assembly has its lugs arranged to engage in circumferentially spaced openings (not shown) in a plate 142. Plate 142 is removably secured to the frame member 40 and arranged to allow motor shaft to extend through a center opening therein.

The film reader structure shown in Fig. 1 will have, when said brake means is to be employed therein, a position tilted forwardly slightly from that shown so that the axis of the motor shaft will slope forwardly and downwardly in the neighborhood of five degrees or so to the horizontal. (Or if preferred, the removable assembly 16 may be supported upon bosses like those at 46 and 47 but arranged to provide this slight forward slope for the motor shaft.) The shaft carries a squirrel cage rotor and is arranged with a slight amount of end play. Thus the shaft and rotor will tend to come to rest in their forwardmost position and in doing so will close any slight spacing between the plates of the brake means, the pulley 54 and plate 142.

The motor shaft, however, possesses an inherent tendency to move axially slightly in a direction to open the disc spacing as it starts to drive the pulley 54 in either direction since the rotor tends to seek a centered position in the motor field. This axial movement during starting tends to separate the plates of the brake mechanism 140, so that no resistance to rotation is offered thereby. However, when the motor current is shut off, continued rotation of the motor due to the momentum of the parts tends immediately to set up a counter electro-motive force which together with the forward sloping of the motor shaft tends to shift the shaft and rotor axially in the opposite direction. The immediate effect is that the small clearance between the pulley 54, the plates of the brake 140 and plate 142 is taken up and a braking action is applied which materially increases the rate of deceleration of the rotor and rotatable parts connected thereto. Such a braking action is highly desirable in the film handling mechanism described, since as soon as a frame approaches a proper position at the projection aperture and the operator moves the switch 120 to open the electric circuit the brake means becomes effective. Obviously such a brake and motor arrangement as just described could be employed advantageously in other mechanims besides film handling mechanisms. However, its use in the structure desired is highly desirable.

When objectives of higher magnifications than normal are employed in the projection device of the present invention only a portion of the image of a single frame can be accommodated by the viewing screen at a time. Slight movement of the film longitudinally, by control of the switch 120, will allow complete longitudinal coverage of a single frame. In order to image portions of a frame laterally spaced from the center line of the film upon the viewing screen, applicant has arranged curved film gate 13 so as to be shiftable laterally. The gate comprising as shown in Figs. 5 and 6 a lower apertured member 146 arranged to rest upon an upper edge of tubular sleeve 31 of the rotatable film supporting head 24. The upper film guiding surface of the member 146 is arranged, as in said copending application, to curve around the objective and to correspond substantially to the curvature of field thereof. Over the curved film guiding surface of the member 146 fits a removable retaining member 148 held in place by the spaced arms of a U-shaped wire clip 150 which is urged toward the film gate by a pair of resilient springs 152.

A pair of rods 154 extends laterally through openings in the rotatable head 24 and into screw threaded engagement with the lower movable member 146. A handle 156 at the outer end of each of said rods facilitates shifting of the members 146 and 148 laterally from the center position shown in Fig. 6. A pair of spring pressed ball detents 158 are positioned in the upper surface of the member 31 and engage in recesses provided at 160 therefor for releasably retaining the movable gate members either centered or laterally displaced a predetermined amount to either side of the optical axis of the objective 12. While three recesses have been shown in the preferred construction obviously a different number could be employed if desired. When the film gate is shifted to one of its lateral positions the film passing from one reel to the other will be flexed or warped only slightly between the spool and gate but will lie flat against the curved film supporting surface thereof while travelling through the gate.

Having described my invention, I claim:

1. In a projection device having a pair of film reel supporting spindles adapted to be actuated by a driving element, the combination of a drive shaft, a reversible electric motor operatively connected to said drive shaft for rotating same in either direction, a pair of driving members in spaced relation on said shaft, one of said members being secured to said shaft for rotation therewith and the other of said members being rotatably mounted thereon, a shiftable member rotatably carried by said shaft between said driving members and having power transmitting means carried thereby and arranged to drive said element, said shiftable member being movable to different positions upon said shaft so as to be selectively rotated by either of said driving members, gearing connected to said drive shaft and to said rotatably mounted driving member and arranged to cause the latter to rotate at a different speed than that of the drive shaft during the actuation thereof by said motor, yieldable means normally urging said shiftable member toward one of said driving members for establishing a driving connection therebetween, and operator controllable means for causing said shiftable member to move axially toward the other of said driving members for establishing a driving connection therebetween.

2. In a projection device having a pair of film reel supporting spindles adapted to be actuated by a driving element, the combination of a drive shaft, a reversible electric motor operatively connected to said drive shaft for rotating same in either direction, a pair of driving members in spaced relation on said shaft, one of said members being secured to said shaft for rotation therewith and the other of said members being rotatably mounted thereon, a shiftable member rotatably carried by said shaft between said driving members and having power transmitting means carried thereby and arranged to drive said element, said shiftable member being movable to different positions upon said shaft so as to be selectively rotated by either of said rotatable driving members, gearing connected to said shaft and to said rotatably mounted driving member and arranged to cause the latter to rotate at a different speed than that of the drive shaft during actuation thereof by said motor, a lever arranged to axially move said shiftable member, resilient means normally urging said shiftable member toward one of said driving members for establishing a driving connection therebetween, a solenoid connected to said lever and arranged when energized to move said lever to establish a driving connection between said shiftable member and the other of said driving members, and switch means conveniently located for actuation by the operator of the device for controlling the operation of the motor and for effecting an energizing of said solenoid when a change of speed is desired.

3. In a projection device having a pair of film reel supporting spindles adapted to be actuated by a driving element, the combination of a drive shaft, a reversible electric motor operatively connected to said drive shaft for rotating same in either direction, a pair of driving members in spaced relation on said shaft, one of said members being secured to said shaft for rotation therewith and the other of said members being rotatably mounted thereon, a shiftable member rotatably carried by said shaft between said driving members and having power transmitting means carried thereby and arranged to drive said element, said shiftable member being movable to different positions upon said shaft so as to be selectively rotated by either of said rotatable driving members, gearing connected to said shaft and to said rotatably mounted driving member and arranged to cause the latter to rotate at a different speed than that of the drive shaft during actuation thereof by said motor, a lever arranged to axially move said shiftable member, resilient means normally urging said shiftable member toward one of said driving members for establishing a driving connection therebetween, a solenoid connected to said lever and arranged when energized to move said lever and said shiftable member to terminate said driving connection and establish a driving connection between said shiftable member and the other of said driving members, and a two-way manually operable switch connected to said motor and solenoid and arranged when moved to a first position in either direction to effect a corresponding forward or reverse rotation of said motor and when subsequently moved to a second position in either direction to energize said solenoid for effecting a change of speed of said power transmitting means.

4. A unitary driving assembly comprising a rigid supporting frame having an elongated plate-like portion and a rigid bracket portion extending laterally therefrom, a drive shaft rotatably carried by said elongated portion and said bracket portion, a reversible electric motor supported by said elongated portion and arranged to actuate said shaft in either direction, a driving pulley rotatably mounted on said shaft, a pair of driving members positioned on said shaft at opposite sides of said pulley, one of said driving members being secured to said shaft and the other being rotatable relative thereto, gearing connected to said shaft and to said rotatable driving member for driving the latter at a speed different than the speed of the shaft when the motor is energized, a lever pivoted on said frame and arranged to shift said pulley axially relative to said shaft, resilient means connected to said lever for normally urging said pulley toward one of said driving members for establishing a driving connection therebetween, a solenoid carried by said frame and connected to said lever so as to move said pulley toward the other of said driving members for actuation thereby when the solenoid is energized, and a pair of spaced idling pulleys carried by said bracket portion with their planes of rotation angularly disposed relative to the plane of the driving pulley and in such relation to said driving pulley that a tangent from each idling pulley extends substantially tangentially to spaced peripheral portions on said driving pulley.

5. A unitary driving assembly comprising a rigid supporting frame having an elongated plate-like portion and a pair of supporting arms adjacent an end thereof, a rigid bracket secured to said supporting frame between said arms and extending laterally therefrom in spaced relation to said arms, a drive shaft rotatably carried by said elongated portion and said bracket, a reversible electric motor supported by said elongated portion and arranged to actuate said shaft in either direction, a driving pulley rotatably mounted on said shaft, a pair of driving members positioned on said shaft at opposite sides of said pulley, one of said driving members being secured to said shaft and the other being rotatable relative thereto, gearing connected to said shaft and to said rotatable driving member for driving the latter at a speed different than the speed of said shaft when the motor is energized, a lever pivoted on said frame and arranged to shift said pulley axially relative to said shaft, resilient means connected to said lever for normally urging said pulley toward one of said driving members for establishing a driving connection therebetween, a solenoid carried by said frame and connected to said lever so as to move said pulley toward the other of said driving members for actuation thereby when the solenoid is energized, a pair of spaced idling pulleys carried by said bracket with their planes of rotation angularly disposed relative to the plane of the driving pulley and in such relation to said driving pulley that a tangent from each idling pulley extends substantially tangentially to spaced peripheral portions on said driving pulley, and a plurality of elongated slots in said supporting arms arranged to extend in the general direction of the planes of rotation of said idling pulleys.

6. A unitary driving assembly arranged for use within an enclosed cabinet type strip film projection device and adapted to actuate a rotatable film driving element therein through the medium of an endless belt, said mechanism comprising a rigid frame having a substantially vertically extending main portion and an attaching portion extending generally laterally therefrom, a bracket secured to said frame, a drive shaft rotatably supported by said bracket and said main portion, a reversible electric motor carried by said main portion and arranged to drive said shaft in either direction, a driving pulley on said shaft, means including a friction clutch for effecting an operative connection between said shaft and pulley, a pair of idling pulleys supported on opposite sides of said bracket in such relation to the driving pulley as to be substantially tangentially aligned respectively with spaced peripheral portions thereof, said idling pulleys also being arranged in predetermined relation so as to be tangentially aligned with said rotatable element when said assembly is positioned in the projection device, and a plurality of elongated slots in the attaching portion of said frame adapted to receive bolts for attaching same to said device, said slots being arranged to extend in the same general direction as said idling pulleys so as to allow adjustment of said frame toward or away from the rotatable element in the device for tensioning of the associated endless belt.

7. A unitary driving assembly arranged for use within an enclosed cabinet type of strip film projection device and adapted to actuate a rotatable film driving element therein through the medium of an endless belt, said mechanism comprising a rigid frame having a substantially vertically disposed main portion and an attaching portion extending generally laterally therefrom, a drive shaft and a reversible electric motor for actuating same in either direction carried by said frame, a driving pulley on said shaft, a pair of driving members upon said shaft at opposite sides of said pulley, one of said members being secured to said shaft and the other rotatable relative thereto, gearing connected to said shaft and rotatable driving member for rotating the latter at a speed different than the speed of said shaft, a lever for axially shifting said pulley, resilient means arranged to normally urge the pulley toward one of said members for actuation thereby, a solenoid carried by said frame and connected to said lever for moving the pulley toward the other of said members for actuation thereby, a bracket secured to said frame, a pair of spaced idling pulleys supported by said bracket and positioned so as to be substantially tangentially aligned with spaced peripheral portions of said driving pulley, said idling pulleys also being arranged in predetermined relation to said frame so as to be tangentially aligned with said rotatable element when said assembly is positioned in the projection device, and a plurality of elongated slots in the attaching portion of said frame adapted to receive bolts or the like for attaching same to said device, said slots being arranged to extend in the same general direction as said idling pulleys so as to allow adjustment of said frame toward or away from the rotatable element in the device for tensioning of the associated endless belt.

8. A unitary driving assembly arranged for use within an enclosed cabinet type of strip film projection device and adapted to actuate a rotatable film driving element therein through the medium of an endless belt, said mechanism comprising a rigid frame having a substantially vertically disposed main portion and an attaching portion extending laterally therefrom, a drive shaft and a reversible electric motor for actuating same in either direction carried by said frame, a driving pulley on said shaft, a pair of driving members upon said shaft at opposite sides of said pulley, one of said members being secured to said shaft and the other rotatable relative thereto, a reduction gearing connected to said shaft and said rotatable member for rotating the latter at a speed less than the speed of said shaft, a lever for shifting said pulley axially on said shaft, resilient means normally urging said pulley toward one of said members for actuation thereby, a solenoid carried by said frame and connected to said lever for moving the pulley toward the other of said members for actuation thereby, a bracket secured to said frame, a pair of spaced idling pulleys supported by said bracket and positioned so as to be substantially tangentially aligned with said driving pulley, said idling pulley also being arranged in predetermined relation to said frame so as to be tangentially aligned with said rotatable element when said assembly is positioned in the projection device, a plurality of elongated slots in the attaching portion of said frame adapted to receive bolts or the like for attaching same to said device, said slots being arranged to extend in the same general direction as said idling pulleys so as to allow adjustment of said frame toward or away from the rotatable element in the device for tensioning of the associated endless belt, and an adjustable resistor on said frame and connected to said solenoid for controlling the amount of electric current supplied thereto.

9. In a projection device of the character described the combination of a supporting head mounted for rotational movement about the optical axis of the device and having a pair of supporting arms secured thereto and extending laterally in opposite directions from said axis, a pair of supporting spindles on said arms adapted to position film reels in transverse alignment with said optical axis and to tension the film therebetween, a centrally located recess in said supporting head, an apertured film gate in said recess, said film gate being normally centered with respect to said optical axis and having a pair of longitudinally curved guiding surfaces upon said gate at opposite sides of said aperture, said surfaces being arranged to support the tensioned film spanning said aperture in a predetermined longitudinally curved shape, manually operable means secured to said gate and extending outwardly of said recess for enabling an operator to move said gate to projection positions laterally disposed with respect to said centered position, means for retaining said gate in said recess in any of its positions of adjustment, said film gate being constructed and arranged to support said film for free longitudinal movement in all positions of said gate, and means for moving said film longitudinally of said gate.

10. In a projection device of the character described the combination of a supporting head mounted for rotational movement about the optical axis of the device and having a pair of supporting arms secured thereto and extending laterally in opposite directions from said optical axis, a pair of spindles on said arms adapted to position film reels in transverse alignment with said optical axis and to tension the film therebetween, a centrally located recess in said supporting head, an apertured film gate in said recess and normally centered with respect to said optical axis, film guiding means on said gate adjacent said aperture, said film guiding means being so constructed and positioned relative to said reels that it is normally engaged by portions of one side only of said tensioned film, readily operable means secured to said gate and extending laterally with respect to the direction of travel of the film across the film gate for enabling an operator to move said gate to projection positions laterally disposed with respect to said centered position, resilient means for releasably retaining said gate in said centered or laterally adjusted positions, as desired, while pictures on said film are being projected by said device as well as while the film is being moved across the aperture of said film gate and means for moving said film longitudinally across said gate.

11. In a projection device of the character described the combination of an enclosed cabinet, a supporting head having a cylindrical sleeve mounted on said cabinet for rotational movement about the optical axis of said device and a pair of supporting arms outside of said cabinet and extending laterally in opposite directions from said sleeve, a pair of spindles on said arms adapted to position film reels in transverse alignment with said optical axis and to tension the film therebetween, a centrally located recess in said supporting head, an apertured film gate in said recess and normally centered with respect to said optical axis, manually operable means secured to said gate and extending outwardly beyond said head for enabling an operator to move said gate to projection positions laterally disposed relative to said centered position, a driving ring concentrically mounted relative to said axis, spindle driving means on said head operatively connected to said driving ring, a driving mechanism in said cabinet operatively connected to said ring and including a reversible electric motor for actuating film across said gate in either direction regardless of the angular position of said head, and resilient means on said head and arranged to retain said gate in said centered or laterally adjusted positions, as desired.

12. In a projection device having a pair of film reel supporting spindles adapted to be actuated by a driving element, the combination of a drive shaft, a reversible electric motor operatively connected to said drive shaft for rotating same in either direction, a pair of driving members on said shaft, one of said members being secured to said shaft so as to rotate therewith and the other of said members being rotatably mounted thereon, shiftable means rotatably carried by said shaft adjacent said driving members and carrying means for actuating said driving element, said shiftable means being movable to different positions upon said shaft so as to be selectively rotated by one or the other of said driving members, gearing connected to said drive shaft and to said rotatably mounted driving member and arranged to cause the latter to rotate at a different speed than that of the drive shaft during the actuation thereof by said motor, yieldable means normally urging said shiftable means toward one of said driving members for establishing a driving connection therebetween, and operator controllable means for causing said shiftable means to move axially toward the other of said driving members for establishing a driving connection therebetween.

13. In a projection device of the character described the combination of means for positioning a pair of film reel supporting spindles upon the device at opposite sides of the optical axis thereof and in transverse alignment therewith and arranged to hold the film tensioned therebetween during use of the device, a centrally located recess in said means, an apertured film gate in said recess, said film gate being normally centered with respect to said optical axis and having a pair of longitudinally curved surfaces upon said gate at opposite sides of said aperture, said surfaces being arranged to support the tensioned film spanning said aperture in a predetermined longitudinally curved shape, which has its center or centers of curvature on the side of the film toward the objective of the device, readily operable means secured to said gate and extending outwardly of said recess for enabling an operator to move said gate to projection positions laterally disposed with respect to said centered position, and means for retaining said gate in said recess in any of its projection positions.

DAVID I. CRITOPH.

REFERENCES CITED

The following references are of record in the file of this patent:

UNITED STATES PATENTS

| Number | Name | Date |
|---|---|---|
| 1,652,319 | Naul | Dec. 13, 1927 |
| 1,860,631 | Stewart | May 31, 1932 |
| 1,889,575 | Sebille | Nov. 29, 1932 |
| 2,008,982 | Hopkins | July 23, 1935 |
| 2,125,582 | Pratt et al. | Aug. 2, 1938 |
| 2,145,616 | Waterworth | Jan. 31, 1939 |
| 2,177,638 | Draeger | Oct. 31, 1939 |
| 2,279,463 | Hopkins | Apr. 14, 1942 |
| 2,323,372 | Bryce | July 6, 1943 |
| 2,332,810 | Place | Oct. 26, 1943 |
| 2,377,476 | Berglund | June 5, 1945 |
| 2,445,658 | Bishofberger | July 20, 1948 |
| 2,464,220 | Duncan | Mar. 15, 1949 |